United States Patent [19]

Land et al.

[11] 4,424,326
[45] Jan. 3, 1984

[54] COPOLYMERIC MORDANTS

[75] Inventors: Edwin H. Land, Cambridge; Irena Y. Bronstein-Bonte, Newton; Lloyd D. Taylor, Lexington, all of Mass.

[73] Assignee: Polaroid Corporation, Cambridge, Mass.

[21] Appl. No.: 361,422

[22] Filed: Mar. 24, 1982

Related U.S. Application Data

[62] Division of Ser. No. 142,636, Apr. 22, 1980, Pat. No. 4,322,489.

[51] Int. Cl.[3] ............... C08F 226/06; G03C 1/40
[52] U.S. Cl. .................... 526/265; 430/213; 430/238
[58] Field of Search ............................ 526/265

[56] References Cited

U.S. PATENT DOCUMENTS

| | | | |
|---|---|---|---|
| 2,448,542 | 9/1948 | McQueen et al. | 526/265 |
| 2,843,573 | 7/1958 | Melamed | 526/265 |
| 3,068,215 | 12/1962 | Laakso et al. | 526/265 |
| 3,148,061 | 9/1964 | Haas | 96/29 |
| 3,651,033 | 3/1972 | Armen et al. | 526/265 |
| 3,698,896 | 10/1972 | Abbott | 96/3 |
| 3,709,690 | 1/1973 | Cohen et al. | 260/78 SC |
| 3,758,445 | 9/1973 | Cohen et al. | 260/78 SC |
| 3,770,439 | 11/1973 | Taylor | 96/77 |
| 4,009,031 | 2/1977 | Carlson et al. | 96/29 D |
| 4,080,346 | 3/1978 | Bedell | 260/17 A |
| 4,312,940 | 1/1982 | Nakamura et al. | 526/265 |

FOREIGN PATENT DOCUMENTS

807488 1/1959 United Kingdom .

Primary Examiner—Harry Wong, Jr.
Attorney, Agent, or Firm—Louis G. Xiarhos

[57] ABSTRACT

Copolymeric mordant materials containing recurring units according to the following formula are disclosed:

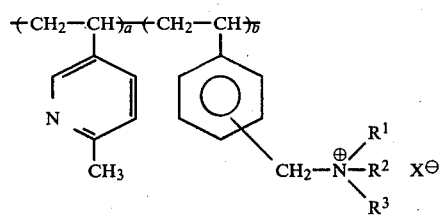

In such copolymers, each of $R^1$, $R^2$ and $R^3$ can independently be alkyl; substituted alkyl; cycloalkyl; aryl; aralkyl; alkaryl; or at least two of $R^1$, $R^2$ and $R^3$, together with the quaternary nitrogen atom to which they are bonded, can complete a saturated or unsaturated, substituted or unsubstituted nitrogen-containing heterocyclic ring; and X is an anion. The molar ratio of a:b can range from about 0.1:1 to about 10:1, e.g., about 0.3:1 to about 3:1. The copolymeric mordant materials can be utilized as image-receiving layers and in photographic products and processes of the diffusion transfer type. The mordants are especially adapted to the production of dye images free of objectionable haze, yellowing or related image defects.

9 Claims, 4 Drawing Figures

COPOLYMERIC MORDANTS

CROSS-REFERENCE TO RELATED APPLICATION

This application is a division of our copending application U.S. Ser. No. 142,636, filed Apr. 22, 1980, and now U.S. Pat. No. 4,322,489.

BACKGROUND OF THE INVENTION

This invention relates to copolymeric materials having dye mordanting capability. More particularly, it relates to mordant copolymers especially suited to application in photographic diffusion transfer products and processes.

Diffusion transfer photographic products and processes have been described in numerous patents, including, for example, U.S. Pat. Nos. 2,983,606; 3,345,163; 3,362,819; 3,594,164; and 3,594,165. In general, diffusion transfer photographic products and processes involve film units having a photosensitive system including at least one silver halide layer, usually integrated with an image-providing material, e.g., an image dye-providing material. After photoexposure, the photosensitive system is developed, generally by uniformly distributing an aqueous alkaline processing composition over the photoexposed element, to establish an imagewise distribution of a diffusible image-providing material. The image-providing material is selectively transferred, at least in part, by diffusion to an image-receiving layer or element positioned in a superposed relationship with the developed photosensitive element and capable of mordanting or otherwise fixing the image-providing material. The image-receiving layer retains the transferred image for viewing and in some diffusion transfer products, the image is viewed in the layer after separation from the photosensitive element, while in other products, such separation is not required.

Various polymeric materials have been utilized as mordants in photographic products and processes including those of the diffusion transfer type. Thus, polymeric mordants suited to application in diffusion transfer products and processes for the formation of photographic images in dye are described, for example, in U.S. Pat. Nos. 3,148,061 (issued Sept. 8, 1964 to H. C. Haas); 3,758,445 (issued Sept. 11, 1973 to H. L. Cohen et al.); 3,770,439 (issued Nov. 6, 1973 to L. D. Taylor); and in 4,080,346 (issued Mar. 31, 1978 to S. F. Bedell). The advantageous utilization of a particular mordanting material in a photographic product or process will oftentimes depend upon the particular requirements of a photographic product or process and deficiencies or disadvantages associated with the utilization of a particular mordanting material may be observed. Thus, deficiencies in mordanting capacity with respect to one or more dye materials desirably utilized or the formation of a photographic image exhibiting haze, yellowing or other related image defects may be observed. Additionally, difficulties in the synthesis or preparation of a polymeric material exhibiting desirable mordanting capability or in the efficient coating of a suitable image-receiving layer containing a polymeric mordant may impose formidable limitations upon practical utilization of a particular mordanting material.

It is an object of the present invention to provide polymeric mordants exhibiting efficient dye mordanting capability.

It is another object of the present invention to provide polymeric mordants exhibiting such mordanting capability and adapted to utilization in photographic products and processes.

Still another object of the present invention is the provision of polymeric mordants useful in photographic diffusion transfer products and processes in the formation of dye images free of objectionable haze, yellowing or other related image defects.

It is still another object of the present invention to provide such polymeric mordants capable of ready synthesis and efficient utilization in the preparation of coated image-receiving layers containing such polymeric mordants.

Other objects of the present invention will become apparent from the description appearing hereinafter.

SUMMARY OF THE INVENTION

These and other objects can be achieved by the present invention which provides copolymeric mordant materials containing recurring units according to the formula:

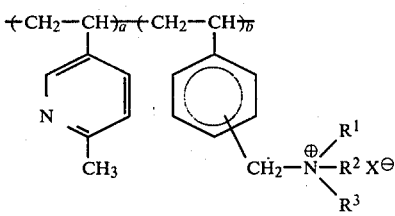

FORMULA I wherein each of $R^1$, $R^2$ and $R^3$ is independently alkyl (e.g., methyl, propyl, butyl); substituted-alkyl (e.g., hydroxyethyl, hydroxypropyl; cycloalkyl (e.g., cyclohexyl); aryl (e.g., phenyl, naphthyl); aralkyl (e.g., benzyl); alkaryl (e.g., tolyl); or at least two of $R^1$, $R^2$ and $R^3$ together with the quaternary nitrogen atom to which they are bonded complete a saturated or unsaturated, substituted or unsubstituted nitrogen-containing heterocyclic ring (e.g., morpholino, piperidino or 1-pyridyl); X is a counteranion (e.g., halide); and wherein each of a and b is an integer and the molar ratio of a:b is from about 0.1:1 to about 10:1.

It has been found that copolymeric materials comprising recurring units from 2-methyl-5-vinylpyridine and a vinylbenzyl quarternary ammonium salt, as aforedescribed, exhibit efficient mordanting capacity and are especially suited as mordants in photographic products and processes.

In a product or article aspect of the present invention, there is provided an image-receiving element comprising a support carrying an image-receiving layer comprising a copolymeric mordant as aforedescribed. In another of its product or article aspects, the present invention provides a diffusion transfer film unit which comprises a photosensitive system comprising at least one photosensitive silver halide emulsion layer having associated therewith a diffusion transfer process image dye-providing material and an image-receiving layer adapted to receive an image dye-providing material after photoexposure and processing, the image-receiving layer comprising a copolymeric mordant as aforedescribed.

In a process aspect of the present invention, there is provided a process for forming a diffusion transfer image which comprises the steps of exposing a photosensitive system comprising at least one photosensitive silver halide emulsion layer having associated therewith a diffusion transfer image dye-providing material; contacting the exposed photosensitive system with an aqueous alkaline processing composition, thereby effecting development of the silver halide emulsion (or emulsions) and the formation of an imagewise distribution of diffusible image dye-providing material; and transferring, by imbibition, at least a portion of the imagewise distribution of diffusible image dye-providing material to a superposed image-receiving layer comprising a copolymeric mordant as aforedescribed.

It has been found that copolymeric mordant materials as aforedescribed can be readily formed and coated onto a suitable substrate with formation of an image-receiving layer exhibiting efficient mordanting capability. The present invention permits the formation from diffusion transfer film units and processes, of dye images exhibiting freedom from objectionable haze, yellowing or related image defects.

For a fuller understanding of the nature and objects of the invention, reference should be had to the following detailed description taken in connection with the accompanying drawings.

DETAILED DESCRIPTION OF THE INVENTION

Figure 1:
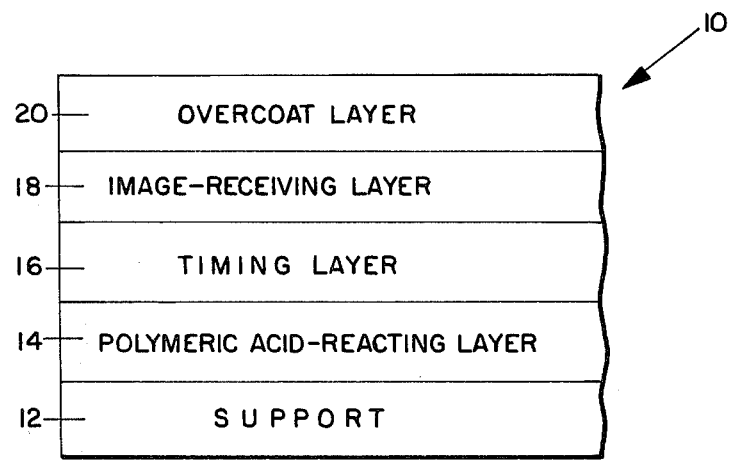
FIG. 1 is a diagrammatic cross-sectional view of an image-receiving element of the invention comprising a support material, a polymeric acid-reacting layer, a timing layer, an image-receiving layer of the invention and an overcoat layer.

As mentioned previously, the present invention is directed toward copolymeric mordant materials and to photographic elements, products and processes utilizing such copolymeric mordant materials. When utilized in the image-receiving layers of the photographic elements or products of this invention, these copolymeric mordant materials function to fix or mordant diffusible dye image-providing materials. Thus, color images can be formed in image-receiving layers comprising the copolymeric mordants of the present invention by transferring to the image-receiving layer an imagewise distribution of diffusible image dye-providing material and utilizing the copolymeric mordant to fix and hold the transferred dye in the layer.

As can be appreciated from inspection of Formula I, the copolymeric mordants of the present invention comprise recurring units resulting from the polymerization of copolymerizable ethylenically-unsaturated co-monomers. Thus, the copolymers comprise repeating or recurring units resulting from the polymerization of the comonomer 2-methyl-5-vinylpyridine. In addition, the copolymers of the invention comprise repeating or recurring units from a copolymerizable vinylbenzyl quaternary ammonium salt having the formula

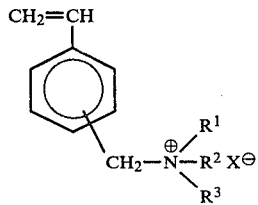

FORMULA II wherein each of $R^1$, $R^2$, $R^3$ and X have the meanings hereinbefore ascribed.

The nature of the quaternary nitrogen groups of the compounds of Formula II and of the recurring units of the copolymeric mordants of the invention can vary with nature of the $R^1$, $R^2$ and $R^3$ groups thereof. Thus, the $R^1$, $R^2$ and $R^3$ substituents on the quaternary nitrogen atom of the compounds of Formula II, and present in the recurring units of the copolymeric mordants hereof, can each be alkyl (e.g., methyl, ethyl, propyl, butyl); substituted-alkyl (e.g., hydroxyethyl, hydroxypropyl); cycloalkyl (e.g., cyclohexyl); aryl (e.g., phenyl, naphthyl); aralkyl (e.g., benzyl); or alkaryl (e.g., tolyl). Preferred $R^1$, $R^2$ and $R^3$ groups include alkyl, such as alkyl groups of from 1 to about 8 carbon atoms, cyclohexyl and benzyl. Especially preferred compounds represented by Formula II and providing recurring units of the copolymeric mordants hereof are those wherein each of $R^1$, $R^2$ and $R^3$ is the same alkyl group such as methyl. Other preferred compounds herein are those, for example, wherein $R^1$ and $R^2$ are each alkyl, e.g., methyl, and $R^3$ is cyclohexyl.

As indicated previously, the groups $R^1$, $R^2$ and $R^3$ of the compounds of Formula II, and of the corresponding recurring units of the copolymeric mordants hereof, can complete with the quaternary nitrogen atom a nitrogen-containing heterocyclic ring. The nitrogen-containing heterocyclic ring can comprise a saturated or unsaturated ring and, additionally, can be a substituted or unsubstituted heterocyclic ring. It will be appreciated that the formation of a saturated N-containing heterocyclic ring will involve two of the $R^1$, $R^2$ and $R^3$ groups while in the formation of an unsaturated nitrogen-containing heterocyclic ring such as 1-pyridyl, each of groups $R^1$, $R^2$ and $R^3$ will be involved. Other examples of suitable nitrogen-containing heterocyclic groups formed with the quaternary nitrogen atom include morpholino and piperidino.

The particular nature of the $R^1$, $R^2$ and $R^3$ substituents of the compounds of Formula II and of the copolymeric mordants hereof will depend upon the particular mordanting capability desired in the copolymeric mordant and upon any influence of such substituent groups on such properties of the copolymeric mordants as solubility, swellability or coatability. The $R^1$, $R^2$, and $R^3$ groups of a recurring unit of the copolymeric mordants hereof can, as indicated, be the same or different to suit particular applications. Similarly, copolymeric mordants comprising recurring units from two or more compounds represented by the structure of Formula II are also contemplated herein. Such copolymeric mordants may comprise recurring units from each of differently substituted compounds exhibiting differences in mordanting capability or affinity to dyes or variously affecting desired properties of the copolymeric mordants. It will be appreciated that copolymeric mordants of this type can be prepared by the polymerization of 2-methyl-5-vinylpyridine with a mixture of two or more dissimilar ethylenically-unsaturated copolymerizable compounds represented by the structure of Formula II, i.e., a mixture of compounds wherein the $R^1$, $R^2$ and $R^3$ substitution of the respective compounds is different.

The moiety X shown in the compounds represented by structure of Formula II, and in the copolymeric mordants represented by the structure of Formula I, is an anion such as halide (e.g., bromide or chloride). Other anionic moieties representive of anion X include sulfate, alkyl sulfate, alkanesulfonate, arylsulfonate (e.g., p-toluenesulfonate), acetate, phosphate, dialkyl phosphate or the like. A preferred anion is chloride.

Suitable examples of ethylenically-unsaturated monomers representative of compounds of Formula II useful in the preparation of copolymeric mordants of the present invention are vinylbenzyl trimethyl ammonium chloride, vinylbenzyl trihexyl ammonium chloride, vinylbenzyl dimethylcyclohexyl ammonium chloride, vinylbenzyl dimethylbenzyl ammonium chloride, vinylbenzyl triethyl ammonium chloride, vinylbenzyl triethyl ammonium chloride and vinylbenzyl pyridinium chloride. Mixtures comprising positional isomers can be employed. A preferred vinylbenzyl quaternary salt comprises a mixture of positional isomers (para and meta) of vinylbenzyl trimethyl ammonium chloride.

Representative structures of recurring units of the copolymeric mordants of the present invention include:

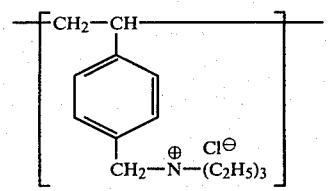

FORMULA III

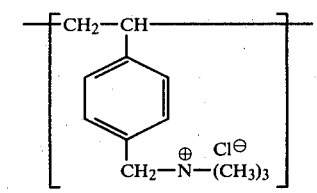

FORMULA IV

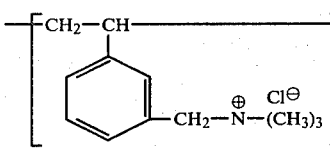

FORMULA V

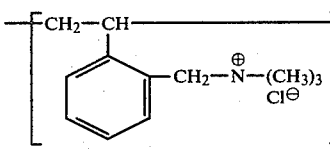

FORMULA VI

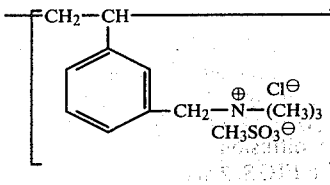

FORMULA VII

The ratio of recurring units in the copolymeric mordants hereof, represented by integers a and b in the polymers of Formula I, can vary widely. The molar ratio of recurring units from 2-methyl-5-vinylpyridine to recurring units from a vinylbenzyl quaternary ammonium salt, i.e., the ratio of a:b, will normally vary within the range of from about 0.1:1 to about 10:1. The presence in the copolymeric mordants of proportions of recurring units from 2-methyl-5-vinylpyridine and from a vinylbenzyl quaternary ammonium salt such that the respective ratio of such recurring units is at least about 0.1 to 1 assures the introduction of hydrophobicity into the copolymeric mordant material. In general, higher densities are realizable where the content of recurring units from the vinylbenzyl quaternary ammonium salt is high relative to the proportion of the recurring units from 2-methyl-5-vinylpyridine. Correspondingly, image haze tends to be associated with the utilization of such copolymeric mordants where the content of recurring units from the vinylbenzyl quaternary ammonium salt is high relative to the content of recurring units from 2-methyl-5-vinylpyridine. The presence in the copolymeric mordants of the invention of recurring units from 2-methyl-5-vinylpyridine and from a vinylbenzyl quaternary ammonium salt such that the respective ratio is greater than about 10:1 tends to introduce excess hydrophobicity into the polymeric material and reduce obtainable dye densities. It will be appreciated that within the aforesaid ranges, changes in the ratio of recurring units from 2-methyl-5-vinylpyridine and from a vinylbenzyl quaternary ammonium salt will influence the physical and functional properties of the copolymeric mordant materials of the invention. Thus, copolymeric mordant polymers comprising recurring units from 2-methyl-5-vinylpyridine and from vinylbenzyl trimethyl ammonium chloride in respective molar proportions, for example, of from 0.3:1 to 1:1 exhibit solubility in alkali while such copolymeric materials wherein the ratio of a:b is, for example, from 2:1 to 3:1 do not exhibit such alkali solubility.

Preferably, the relative proportions of recurring units from 2-methyl-5-vinylpyridine and from a vinylbenzyl quaternary ammonium salt will be such that the molar ratio of such respective recurring units is from about 0.3:1 to about 3:1. In general, such ratios will be preferred from the standpoint of the provision of copolymeric mordants of desired hydrophobic, solubility and coatability properties. Additionally, such copolymers permit the realization of efficient mordanting and desired maximum densities while achieving desirable absence of objectionable image yellowing, haze or related defects. An especially preferred mordant copolymer hereof comprises the following wherein the recurring units from the vinylbenzyl quaternary salt comprise a mixture of para and meta isomers and wherein the ratio of a:b is from about 0.3:1 to about 3:1.

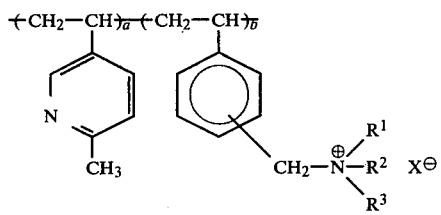

The copolymeric mordants of the present invention can be prepared by the polymerization in suitable proportions of the 2-methyl-5-vinylpyridine and vinylbenzyl quaternary ammonium salt monomers set forth hereinbefore. The polymerization can be conducted by resort to bulk, solution, suspension or emulsion polymerization techniques. The polymerization can be initiated chemically, as by the utilization of a suitable free-radical polymerization initiator or redox initiator. Suitable free-radical polymerization initiators include the water-soluble or alcohol-soluble azo-type initiators such as 4,4'-azibis-4(cyanovaleric acid), azobisisobutyronitrile, diazoaminobenzene and 2,2'-azobis(2-amidinopropane) hydrochloride. Suitable redox-type polymerization initiators include a combination of a reducing agent such as sodium bisulfite, ascorbic acid or a ferrous salt and an oxidizing agent such as benzoyl peroxide, ammonium persulfate, hydrogen peroxide, diacetyl peroxide, t-butyl hydroperoxide or an alkali metal persulfate. The amount of catalyst employed can be varied to suit particular needs. In general, satisfactory polymerization reactions can be conducted over a temperature range of from about 25° C. to about 100° C. utilizing less than about 5% by weight of the initiator, based upon the weight of the copolymerizable monomers.

A preferred means of preparing the copolymeric mordant materials of the invention involves the polymerization of 2-methyl-5-vinylpyridine and a copolymerizable monoethylenically-unsaturated monomer of the type represented by Formula II herein in the presence of an aqueous alcohol solvent medium. The utilization of an aqueous alcohol solvent medium provides a polymeric product which can be readily coated onto a suitable substrate material with formation of a clear and uniform polymeric layer. Polymerization, for example, in a mixture of water and ethanol (80/20 wt.%) constitutes a preferred method for the formation of the copolymeric mordants hereof. The method whereby polymerization is conducted in an aqueous alcohol solvent medium is described in greater detail and is claimed in the application of I. Y. Bronstein-Bonte and E. P. Lindholm, filed on even date, and now U.S. Pat. No. 4,340,522.

The copolymeric mordant materials of the present invention can be utilized for the provision of an image-receiving layer for photographic images in dye, and in particular, for the provision of multicolor dye images. The copolymeric mordant material of the invention can alone comprise the image-receiving layer or can be employed in admixture with other polymeric materials to comprise an image-receiving layer. Particularly preferred is an image-receiving layer comprising a mixture or blend of a copolymeric mordant material of the invention, as hereinbefore described, with other known polymeric image-receiving layer materials, particularly hydrophilic polymeric materials such as gelatin, polyvinylalcohol, polyvinylpyrrolidones, and mixtures of these. The materials utilized in admixture with the copolymeric mordant material hereof and the relative amounts of each can depend, for example, on the nature and amount of dye desirably mordanted and upon the permeability of the image-receiving layer to an aqueous alkaline processing composition. Particularly preferred image-receiving layers comprise a mixture of the copolymeric mordant hereof and polyvinylalcohol where the ratio by weight of polyvinylalcohol to the copolymeric mordant hereof is about 0.3:1 to about 3:1.

Image-receiving layers comprising the copolymeric mordants of this invention can be utilized, for example, in image-receiving elements designed to receive and mordant image dye-providing materials. Such image-receiving elements will generally comprise a suitable support carrying an image-receiving layer comprising a copolymeric mordant of this invention and also one or more polymeric acid-reacting layers such as those described, for example, in U.S. Pat. No. 3,362,819. These polymeric acids can be polymers which contain acid groups, e.g., carboxylic acid and sulfonic acid groups, which are capable of forming salts with alkali metals or with organic bases; or potentially acid-yielding groups such as anhydrides or lactones. The polymeric acid-reacting layer functions to reduce the environmental pH of a diffusion transfer system in which the image-receiving layer is utilized and, thereby, provides the advantages and benefits thereof known in the art.

An interlayer or spacer layer may be disposed between the polymeric acid layer and the image-receiving layer in order to control the pH reduction so that it is not premature, e.g., to "time" control the pH reduction. Suitable spacer of "timing" layers for this purpose are described, for example, in U.S. Pat. Nos. 3,362,819; 3,419,398; 3,421,893; 3,433,633; 3,455,686; 3,575,701; and 3,756,815.

Referring to FIG. 1, there is shown a preferred image-receiving element of the invention 10 comprising support material 12 carrying a layer of acid-reacting polymer 14, a timing layer 16, and image-receiving layer 18 comprising a copolymeric mordant of the invention and optional overcoat layer 20. Support material 12 can comprise any of a variety of materials capable of carrying image-receiving layer 18 and other layers as shown in FIG. 1. Paper, vinyl chloride polymers, polyamides such as nylon, polyesters such as polyethylene glycol terephthalate or cellulosic derivatives such as cellulose acetate or cellulose acetate-butyrate can be suitably employed. It will be appreciated that depending upon the particular application intended for image-receiving element 10, the nature of support material 12 as a transparent, opaque or translucent material will be a matter of choice.

According to one embodiment of the present invention, image-receiving element 10 can comprise support material 12 on which is present image-receiving layer 18. Polymeric acid-reacting layer 14 and timing layer 16, each shown in FIG. 1, need not be present in image-receiving element 10, and where such an image-receiving element is utilized in a photographic diffusion transfer product or process, polymeric acid-reacting and timing layers 14 and 16, respectively, can be otherwise suitably positioned in such product or process as will be apparent from the film unit of FIG. 3, described in greater detail hereinafter. According to a preferred embodiment, image-receiving element 10 will include polymeric acid-reacting and timing layers, shown, respectively, in FIG. 1 as layers 14 and 16. The nature and function of such layers in diffusion transfer products and processes is known and described in greater detail hereinafter.

As indicated previously, support 12 of image-receiving element or article 10 can be suitably transparent, opaque or translucent depending upon a particular application of the element or article. Thus, where image-receiving element 10 is desirably utilized in the manufacture of photographic diffusion transfer film units such as shown generally in FIGS. 2 and 3 hereof, where the desired image will be viewed through a support, support 12 will be of transparent material. A preferred material for this purpose is a polyethylene glycol terephthalate sheet-like support material. Alternatively, where image-receiving element 10 is utilized in the manufacture of a photographic film unit such as is generally shown in FIG. 4, where the desired image will be viewed as a reflection print against a light-reflecting layer, support material 12 will preferably be of opaque material.

In FIG. 1 is shown overcoat layer 20 which comprises an optional layer of image-receiving element 10. Image-receiving layer 18 can, thus, comprise the outermost layer of image-receiving element 10. In some instances, it may be desirable to provide such image-receiving layer 18 with a washing treatment, as by washing the layer with ammonia. The washing treatment can be conveniently effected with ammonia or a solution of ammonium hydroxide in a concentration, preferably of from about 2% to about 8% by weight. Such ammonia washing treatment effectively neutralizes residual acrolein/formaldehyde condensate where such material is utilized for the hardening of the image-receiving layer and the provision of reduced water sensitivity. According to one embodiment of the invention, as shown in FIG. 1, an overcoat layer 20 can be present on image-receiving layer 18. Such overcoat layer can be comprised of a polymeric material such as polyvinyl alcohol.

Overcoat layer 20 can also be utilized as means of facilitating separation of image-receiving element 10 from a photosensitive element. Thus, where the image-receiving element is utilized in a photographic film unit which is processed by distribution of an aqueous alkaline processing composition between the image-receiving element and a photoexposed photosensitive element and is adapted, after formation of a dye image, to separation from the developed photosensitivive element and the processing composition, overcoat layer 20 can effectively function as a "strip coat".

An overcoat suited as a "strip coat" can be prepared from a variety of hydrophilic colloid materials. Preferred hydrophilic colloids for an overcoat or "strip coat" for a diffusion transfer image-receiving element requiring separation, subsequent to formation of a transfer image from a processing composition, include gum arabic, carboxymethyl cellulose, hydroxyethyl cellulose, carboxymethyl hydroxyethyl cellulose, cellulose acetate-hydrogen phthalate, polyvinyl alcohol, polyvinyl pyrrolidone, methyl cellulose, ethyl cellulose, cellulose nitrate, sodium alginate, pectin, polymethacrylic acid, polymerized salts of alkyl, aryl and alkyl sulfonic acids (e.g., Daxad, W. R. Grace Co.), and the like.

Overcoat 20 can comprise a solution of hydrophilic colloid and ammonia and can be coated from an aqueous coating solution prepared by diluting concentrated ammonium hydroxide (about 28.7% NH3) with water to the desired concentration, preferably from about 2% to about 8% by weight, and then adding to this solution an aqueous hydrophilic colloid solution having a total solids concentration in the range of about 1% to about 5% by weight. The coating solution also preferably may include a small amount of a surfactant, for example, less than about 0.10% by weight of Triton X-100 (Rohm and Haas, Co., Phila., Pa.). A preferred solution comprises about 3 parts by weight of ammonium hydroxide and about 2 parts by weight of gum arabic.

The image-receiving layers of the present invention find applicability in a number of photographic diffusion transfer products and processes. According to one embodiment of the present invention, the image-receiving layers of the invention are utilized in photographic film units adapted to the provision of photographs comprising the developed silver halide emulsion(s) retained as part of a permanent laminate, with the desired image being viewed through a transparent support against a reflecting background. In such photographs, the image-carrying layer is not separated from the developed silver halide emulsion(s). Diffusion transfer photographic products providing an image viewable without separation against a reflecting background in such a laminate have been referred to in the art as "integral negative-positive film units".

Integral negative-positive film units of a first type are described, for example in the above-noted U.S. Pat. No. 3,415,644 and include appropriate photosensitive layer(s) and image dye-providing materials carried on an opaque support, an image-receiving layer carried on a transparent support and means for distributing a processing composition between the elements of the film unit. Photoexposure is made through the transparent support carrying a polymeric acid-reacting layer, a timing layer and the image-receiving layer of the invention. A processing composition containing a reflecting pigment is distributed between the image-receiving and photosensitive components. After distribution of the processing composition and before processing is complete, the film unit can be, and usually is, transported into light. Accordingly, in integral negative-positive film units of this type, the layer provided by distributing the reflecting pigment provides a reflecting background for viewing through the transparent support the image transferred to the image-receiving layer.

Integral negative-positive film units of a second type, as described, for example, inU.S. Pat. No. 3,594,165, include a transparent support, carrying the appropriate photosensitive layers and associated image dye-providing materials, a permeable opaque layer, a permeable and preformed light-reflecting layer, and means for disbributing a processing composition between the photosensitive layer and a transparent cover or spreader sheet carrying a polymeric acid-reacting layer and a timing layer. Integral negative-positive film units of this second type include an opaque processing composition which is distributed after photoexposure to provide a second opaque layer which can prevent additional exposure of the photosensitive element. In film units of this second type, exposure is made through the transparent cover or spreader sheet. The desired transfer image is viewed against the reflecting pigment-containing layer through the transparent support element.

The arrangement and order of the individual layers of the diffusion transfer film units described herein may vary in many ways as is known in the art, provided the film units comprise an image-receiving layer comprising a copolymeric mordant of the invention. For convenience, however, the more specific descriptions of the invention hereinafter set forth will be by use of dye developer diffusion transfer color processes and of diffusion transfer film units of the type generally contemplated in previously mentioned patents. Thus, details relating to integral negative-positive film units of the first type described hereinbefore can be found in such patents as U.S. Pat. Nos. 3,415,644 and 3,647,437 while details of the second type are found in U.S. Pat. No.

3,594,165. It will be readily apparent from such descriptions that other image-forming reagents may be used, e.g., color couplers, coupling dyes, or compounds which release a diffusible dye or dye intermediate as a result of coupling or oxidation.

Figure 2:
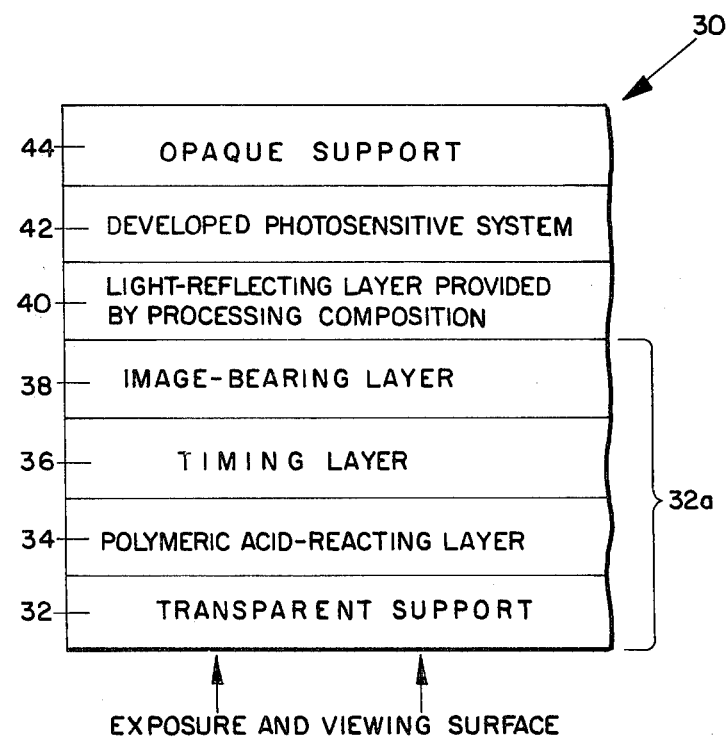
FIGS. 2 to 4 are simplified or schematic views of particular arrangements of film units embodying an image-receiving layer of the present invention and shown after exposure and processing.

Referring now to the drawings, FIG. 2 shows a film unit of the type described in referenced U.S. Pat. Nos. 3,415,644 and 3,657,437, following exposure and processing. The film unit 30 includes a polymeric acid-reacting layer 34, timing layer 36 and image-receiving layer 38 comprising a mordant copolymer of the invention. After photoexposure of photo-sensitive layer(s) 42 (through transparent support 32, polymeric acid-reacting layer 34, timing layer 36 and image-receiving layer 38) the processing composition retained in a rupturable container (not shown) is distributed between layers 38 and 42. Processing compositions used in such film units of the present invention are aqueous alkaline photographic processing compositions comprising a reflecting pigment, usually titanium dioxide, and a polymeric film-forming agent and will preferably contain an optical filter agent described in detail in U.S. Pat. No. 3,647,437.

Distribution of the processing composition over photoexposed portions of photosensitive system 42 provides a light-reflecting layer 40 between image-receiving layer 38 and photosensitive layer(s) 42. This layer, at least during processing, provides sufficient opacity to protect photosensitive system 42 from further photoexposure through transparent support 32. As reflective layer 40 is installed, by application of the processing composition, development of photoexposed photosensitive layer(s) 42 is initiated to establish in manners well-known in the art an imagewise distribution of diffusible image-providing material which can comprise soluble silver complex or one or more dye or dye intermediate image-providing materials. The diffusible image-providing material is transferred through permeable, light-reflecting layer 40 where it is mordanted, precipitated or otherwise retained in or on image-receiving layer 38 of the invention. The resulting transfer image is viewed through transparent support 32 against light-reflecting layer 40.

The light-reflecting layer 40 provided by the embodiment of the invention shown in FIG. 2 is formed by solidification of the stratum of processing composition disbributed after exposure. The processing composition will include the film-forming polymer which provides the polymeric binder matrix for the light-reflecting pigment of layer 40. Absorption of water from the applied layer of processing composition results in a solidified film comprising the polymeric binder matrix and the pigment material, thus, providing the light-reflecting layer 40 which permits the viewing thereagainst of image 38 through transparent support 32. In addition, light-reflecting layer 40 serves to laminate together the developed photosensitive system 42 and the image-bearing layer 38 to provide the final photographic laminate.

Figure 3:
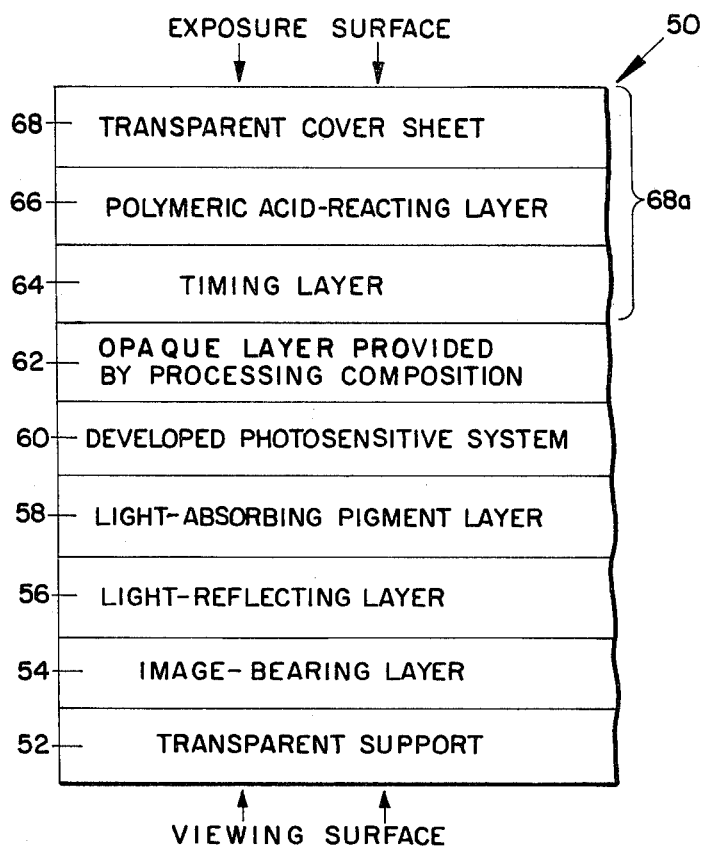
Figure 4:
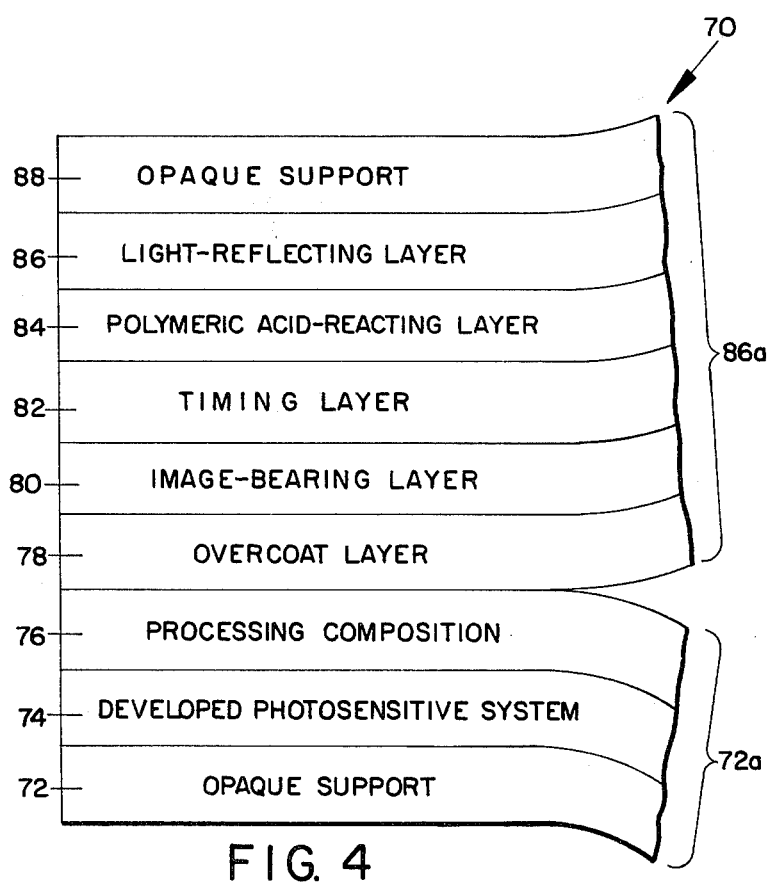

In each of articles 10 and 30, respectively, of FIGS. 1 and 2, and in articles 50 and 70, respectively, of FIGS. 3 and 4, is shown a polymeric acid-reacting layer. In each instance, the polymeric acid-reacting layer, e.g., layer 14 of image-receiving element 10, provides important functions in photographic processing. The processing compositions typically employed in diffusion transfer processes of the type contemplated herein will generally comprise an aqueous alkaline composition having a pH in excess of about 12, and frequently in the order of 14 or greater. The liquid processing composition permeates the emulsion layer(s) of the photosensitive element to effect development thereof. The elevated environmental pH conditions of the film unit upon spreading or distribution of the alkaline processing composition are conducive to the transfer of image dyes. The acid-reacting layer, for example, polymeric acid-reacting layer 14 of image-receiving element 10 or polymeric acid-recacting layer 34 of film unit 30, is, thus, employed to lower in predetermined manner the environmental pH of the film unit following substantial dye transfer in order to increase image stability and/or adjust the pH from a first pH at which the image dyes are diffusible to a second and lower pH at which such image-dyes are not diffusible. Simultaneously, the reduction of pH permits decolorization of opacification dyes utilized in the film unit to provide in-light development capability.

As disclosed in, for example, U.S. Pat. No. 3,362,819, the polymeric acid-reacting layer may comprise a nondiffusible acid-reacting reagent adapted to lower the pH from the first (high) pH of the processing composition in which the image dyes are diffusible to a second (lower) pH at which they are not. The acid-reacting reagents are preferably polymers which contain acid groups, e.g., carboxylic acid and sulfonic acid groups, which are capable of forming salts with alkali metals or with organic bases; or potentially acid-yielding groups such as anhydrides or lactones. Preferably, the acid polymer contains free carboxyl groups. As examples of useful neutralizing layers, in addition to those disclosed in the aforementioned U.S. Pat. No. 3,362,819, mention may be made of those disclosed in the following U.S. Pat. Nos.: Bedell, 3,765,885; Sahatjian, et al., 3,819,371; Haas, 3,833,367; Taylor, 3,754,910 and Schlein, 3,756,815.

In each of the articles shown in FIGS. 1 to 4 is shown a timing layer which is included for the control of the pH-reducing properties of the polymeric acid-reacting layer. Thus, there is shown in FIG. 2 timing layer 36 positioned between polymeric acid-reacting layer 34 and image-receiving layer 38 of the invention. The spacer layer will be comprised of polyvinyl alcohol, gelatin or other polymer through which the alkali may diffuse to the polymeric acid-reacting layer. The presence of such a timing layer between the image-receiving layer 38 and the acid-reacting layer 34 effectively controls the initiation and the rate of capture of alkali by the acid-reacting layer. Suitable materials for the formation of timing layers and the advantages thereof in diffusion transfer systems are described with particularity in U.S. Pat. Nos. 3,362,819; 3,419,389; 3,421,893; 3,455,686; 3,577,237; and 3,575,701.

In the film unit shown in FIG. 2, polymeric acid-reacting layer 34 and timing layer 36 are shown on transparent support 32. If desired, layers 34 and 36 can be positioned between opaque support 44 and photosensitive layer(s) 42. Thus, polymeric acid-reacting layer 34 can be positioned on opaque support 44 and timing layer 36 can be positioned on the polymeric acid-reacting layer. In turn, the emulsion layer(s) comprising photosensitive system 42 can be positioned on the timing layer. In this case, image-receiving element 32a will comprise transparent support 32, and directly thereon, image-receiving layer 38. The utilization of polymeric acid-reacting and timing layers in a photosensitive element as aforedescribed is described in U.S. Pat. Nos. 3,362,821 and 3,573,043.

In accordance with a preferred embodiment of the invention, a photographic film unit will comprise a temporary laminate including the several layers of the photographic film unit confined between two dimensionally stable supports and having the bond between a predetermined pair of layers being weaker than the bond between other pairs of layers. Thus, with reference to FIG. 2, an image-receiving element 32a, comprising transparent support 32, polymeric acid-reacting layer 34, timing layer 36 and image-receiving layer 38 and corresponding generally to image-receiving element 10 of FIG. 1, can be arranged in article 30 such that image-receiving layer 38 is temporarily bonded to the silver halide emulsion layer 42 prior to exposure. The rupturable container or pod (not shown) can then be positioned such that, upon its rupture, the processing composition will delaminate the temporary bond and be distributed between the aforesaid layers 38 and 42. The distributed layer of processing composition upon drying forms light-reflecting layer 40 which serves to bond the layers together to form the desired permanent laminate. Procedures for forming such prelaminated film units, i.e., film units in which the several elements are temporarily laminated together prior to exposure, are described, for example, in U.S. Pat. No. 3,652,281, issued to Albert J. Bachelder and Frederick J. Binda and in U.S. Pat. No. 3,652,282 to Edwin H. Land, both issued Mar. 28, 1972. A particularly useful and preferred prelamination utilizes a water-soluble polyethylene glycol as described and claimed in U.S. Pat. No. 3,793,023, issued Feb. 19, 1974, to Edwin H. Land.

If desired, the film unit shown in FIG. 2 may utilize a transparent support instead of the opaque support 44 shown therein. In accordance with this alternative embodiment, an opaque layer, e.g., pressure-sensitive, should be superposed over said transparent support to avoid further exposure through the back of the film unit during processing outside of the camera. In the embodiment illustrated in FIG. 2, photoexposure is effected through the image-receiving element. While this is a particularly useful and preferred embodiment, it will be understood that the image-receiving element may be initially positioned out of the exposure path and superposed upon the photosensitive element after photoexposure, in which event the processing and final image stages would be the same as in FIG. 2.

In FIG. 3 is shown, following exposure and processing, a second integral negative-positive type of diffusion transfer film unit of the invention utilizing an arrangement of elements generally described in U.S. Pat. No. 3,594,165 and British Pat. No. 1,330,524. Such arrangement provides an integral negative-positive reflection print and photoexposure and viewing are effected from opposite sides. Film unit 50 includes a processing composition initially retained in a rupturable container (not shown) arranged to distribute the processing composition between photosensitive system or layer 60 and a cover or spreader sheet 68a comprising a transparent sheet material 68, polymeric acid-reacting layer 66 and timing layer 64. Spreader sheet 68a facilitates uniform distribution of processing composition after photoexposure of photosensitive system or layer 60 which is effected through transparent sheet material 68. Processing compositions used in such film units are aqueous, alkaline photographic processing compositions which include a light-absorbing opacifying agent, e.g., carbon black.

Distribution of the processing composition between photoexposed photosensitive system or layer 64 and spreader sheet 68a installs an opaque layer 62 which protects system or layer 60 from further photoexposure through transparent spreader sheet 68a. Like the film units of FIG. 3, as and after opaque layer 62 is installed, the processing composition initiates development of photoexposed photosensitive system or layer 60 to establish an imagewise distribution of diffusible image-providing material in manners well-known to the art. For example, the processing composition may contain developing agents sufficient to effect photographic development. Alternatively, developing agents may be present in one or more layers of the film unit so that they may be carried to system or layer 60 by the processing composition. The diffusible imagewise distribution is transferred to image-receiving layer 54 through permeable light-reflecting layer 56 which comprises a preformed layer including a light-reflecting pigment. Film units of the type shown in FIG. 3 may also comprise a preformed and permeable opaque layer 58 including a light-absorbing pigment, e.g., a dispersion of carbon black in a polymer permeable to the processing composition. Such layer, between photosensitive system or layer 60 and light-reflecting layer 56, permits in-light development of film unit 50, providing opacification for the protection of photoexposed photosensitive system or layer 60 against further exposure through transparent support 52 and layers 54 and 56. The transfer image is viewed through transparent support 52 against light-reflecting layer 56.

The image-receiving layers of the present invention can be utilized in so-called "peel-apart" diffusion transfer film units designed to be separated after processing. Such a diffusion transfer film unit of the invention is shown in FIG. 4 as film unit 70. The film unit shown in FIG. 4 comprises a photosensitive element 72a comprising an opaque support 72 carrying a photosensitive layer or system 74. In film units of this type, the photosensitive layer or system 74 is photoexposed and a processing composition 76 is then distributed over the photoexposed layer or system. An image-receiving element 86a, corresponding generally to image-receiving element 10 of FIG. 1, is superposed on the photoexposed photosensitive element. As shown in FIG. 4, image-receiving element 86a comprises an opaque support material 88, and a light-reflecting layer 86, against which the desired transfer image is viewed and which typically will comprise a polymeric matrix containing a suitable white pigment material, e.g., titanium dioxide. A polymeric acid-reacting layer 84 is shown positioned on light-reflecting layer 86 on which is shown timing layer 82, the image-receiving layer 80 of the invention and, in turn, overcoat layer 78, each of which layers is comprised of materials described hereinbefore in connection with the articles and film units shown in FIGS. 1 to 3. Like the film units shown in FIGS. 2 and 3, the processing composition permeates photoexposed photosensitive layer or system 74 to provide an imagewise distribution of diffusible dye image-providing material which is transferred at least in part to image-receiving layer 78. Unlike the film units of FIGS. 2 and 3, however, the transferred dye image is viewed in image-bearing layer 80 against light-reflecting layer 86 after separation of image-receiving element 86a from photosensitive element 72a.

While support material 88 of image-receiving element 86a is shown as being of opaque material, it will be appreciated that a transparent support material can be employed and that the film unit can be processed in the dark or an opaque sheet (not shown), preferably pressure-sensitive, can be applied over such transparent support to permit in-light development. In accordance with a preferred embodiment of the invention, whereby a reflection print is provided upon separation of image-receiving element 86a from photosensitive element 72a, opaque support 88 and light-reflecting layer 86 will comprise, for example, a suitable paper support, coated, preferably on both sides, with a polymeric coating, e.g., polyethylene, pigmented with titanium dioxide. Such a support material can be suitably provided with polymeric acid-reacting layer 84, a timing layer 82, an image-receiving layer 80 of the invention and optional overcoat layer 78, as shown in FIG. 4 with formation of image-receiving element 86a.

It will be appreciated that, where a transparency is desirably provided from film unit 70 of FIG. 4, support 88 can be transparent and light-reflecting layer 86 omitted. The desired image in image-bearing layer 80 can then, upon separation of image-receiving element 86a from photosensitive element 72a, be viewed as a positive transparency through transparent support material 88.

The film units illustrated in FIGS. 2 to 4 have, for convenience, been shown as monochrome films. Multicolor images may be obtained by providing the requisite number of differentially exposable silver halide emulsions, and said silver halide emulsions are most commonly provided as individual layers coated in superposed relationship. Film units intended to provide multicolor images comprise two or more selectively sensitized silver halide layers each having associated therewith an appropriate image dye-providing material providing an image dye having spectral absorption characteristics substantially complementary to the light by which the associated silver halide is exposed. The most commonly employed negative components for forming multicolor images are of the "tripack" structure and contain blue-, green-, and red-sensitive silver halide layers each having associated therewith in the same or in a contiguous layer a yellow, a magenta and a cyan image dye-providing material, respectively. Interlayers or spacer layers may, if desired, be provided between the respective silver halide layers and associated image dye-providing materials or between other layers. Integral multicolor photosensitive elements of this general type are disclosed in U.S. Pat. No. 3,345,163 issued Oct. 3, 1967, to Edwin H. Land and Howard G. Rogers, as well as in the previously noted U.S. Patents, e.g., in FIG. 9 of the aforementioned U.S. Pat. No. 2,983,606.

The image dye-providing materials which may be employed in such processes generally may be characterized as either (1) initially soluble or diffusible in the processing composition, but are selectively rendered non-diffusible in an imagewise pattern as a function of development; or (2) initially insoluble or non-diffusible in the processing composition, but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,774,668; 2,968,554; 2,983,606; 2,087,817; 3,185,567; 3,230,082; 3,345,163; and 3,443,943. As examples of initially non-diffusible materials and their use in color transfer systems, mention may be made of the materials and systems disclosed in U.S. Pat. Nos. 3,185,567; 3,443,939; 3,443,940; 3,227,550; and 3,227,552. Both types of image dye-providing substances and film units useful therewith also are discussed in U.S. Pat. No. 3,647,437, to which reference may be made.

The image-receiving layers of the invention, as indicated hereinbefore, provide certain advantages in photographic diffusion transfer products and processes. Thus, an image-receiving element of the invention comprising a mordant copolymer hereof permits the realization of high maximum dye densities while providing a reduced tendency toward yellowing and haze defects. These advantages are obtained without the need for additional layers over the image-receiving layer of an image-receiving element. Accordingly, an image-receiving element of the invention can be conveniently manufactured by providing a suitable support material with a coating comprising a copolymeric mordant hereof and drying the coating to a suitable image-receiving layer. Where a support material is provided with polymeric acid-reacting and timing layers, an image-receiving layer comprising a copolymeric mordant hereof can be suitably positioned over the timing layer. While it will be preferred to provide an image-receiving element hereof with a suitable ammonia wash, the utilization of an overcoat layer and the materials handling and processing aspects associated therewith can be effectively avoided.

The image-receiving layers of the invention, in addition to the aforesaid advantages, permit the realization of substantial sensitometric uniformity in maximum densities obtained in diffusion transfer processing. This uniformity is observed by comparison of sensitometric responses obtained from separate image-receiving portions from a larger coated expanse of image-receiving material. The reduction in sensitometric variability makes possible the elimination of additional treatments or utilization of additional agents that otherwise may be employed for increased uniformity in sensitometric response. For example, image-receiving elements based upon a mixture of polyvinyl alcohol and poly(4-vinylpyridine) are normally coated, dried and subjected to an additional heating step as a means of improving uniformity in maximum densities obtainable in diffusion transfer processing. Such addditional heating step is not required in the case of the utilization of an image-receiving layer comprising a copolymeric mordant hereof and the additional handling and processing aspects associated can be effectively eliminated.

The following examples are illustrative of the present invention and it will be understood that the invention is not limited thereto. All parts and percentages are by weight, except as otherwise indicated. In each of EXAMPLES I to III hereof, the vinylbenzyl trimethyl ammonium chloride monomer utilized in the polymerization was a mixture predominantly of para and meta isomers and containing a small content of ortho isomer. Accordingly, the structures provided in the examples as indicative of the structure of recurring units from vinylbenzyl trimethyl ammonium chloride reflect the utilization of such a mixture of positional isomers.

EXAMPLE I

Into a 1000-ml. round-bottomed, three-necked flask (equipped with a mechanical stirrer, a thermometer and a refluxing condenser) were added 136.6 grams of 3A ethanol (95% ethanol denatured with methanol), 107.3 grams (0.9 mole) 2-methyl-5-vinylpyridine and 63.5 grams (0.3 mole) of vinylbenzyl trimethyl ammonium chloride. The contents of the flask were stirred until formation of a solution and 546.6 grams of water were added. The resulting solution was sparged for 15 minutes with a flow of nitrogen. The solution was then heated to a temperature of 65° C. under a nitrogen atmosphere provided via the reflux condenser. To the flask was then added 854 milligrams of 4,4′-azobis(4-cyanovaleric acid). The reaction mixture was slowly stirred for 16 hours. Additional water (854 grams) was added to the resulting product to provide a solution of 3:1 mole ratio copolymer of 2-methyl-5-vinylpyridine and vinylbenzyl trimethyl ammonium chloride at a solids content of 10% by weight. The copolymer had the following structure:

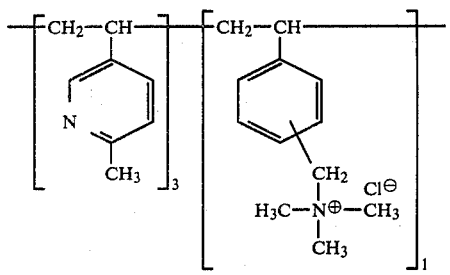

EXAMPLE II

Into a 1000-ml. round-bottomed, three-necked flask (equipped with a mechanical stirrer, a thermometer and a refluxing condenser) were added 52.6 grams (0.44 mole) 2-methyl-5-vinylpyridine and 42.34 grams (0.20 mole) of vinylbenzyl trimethyl ammonium chloride and 339.8 grams of water. The contents of the flask were stirred until formation of a solution and the resulting solution was sparged for 15 minutes with a flow of nitrogen. The solution was then heated to a temperature of 65° C. under a nitrogen atmosphere provided via the reflux condenser. To the flask was then added 424 milligrams of 4,4-azobis(4-cyanovaleric acid). The reaction mixture was slowly stirred for 20 hours. Additional water (212.4 grams) was added to the resulting product to provide a solution of 2.2:1 mole ratio copolymer of 2-methyl-5-vinylpyridine and vinylbenzyl trimethyl ammonium chloride at a solids content of 10% by weight. Analysis for residual 2-methyl-5-vinylpyridine monomer indicated 99.95% conversion while analysis for residual vinylbenzyl trimethyl ammonium chloride indicated 99.93% conversion. The copolymer had the following structure:

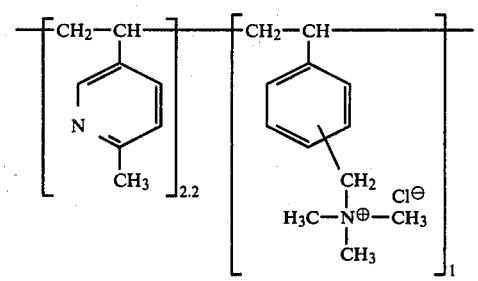

EXAMPLE III

Into a 1000-ml. round-bottomed, three-necked flask (equipped with a mechanical stirrer, a thermometer and a refluxing condenser) were added 65.2 grams of 3A ethanol (95% ethanol denatured with methanol), 35.8 grams (0.3 mole) 2-methyl-5-vinylpyridine and 127.1 grams (0.6 mole) of vinylbenzyl trimethyl ammonium chloride. The contents of the flask were stirred until formation of a solution and 586.4 grams of water were added. The resulting solution was sparged for 15 minutes with a flow of nitrogen. The solution was then heated to a temperature of 65° C. under a nitrogen atmosphere provided via the reflux condenser. To the flask was then added 814 milligrams of 4,4′-azobis(4-cyanovaleric acid). The reaction mixture was slowly stirred for 16 hours. additional water (814.5 grams) was added to the resulting product to provide a solution of 0.5:1 mole ratio copolymer of 2-methyl-5-vinylpyridine and vinylbenzyl trimethyl ammonium chloride at a solids content of 10% by weight. The copolymer had the following structure:

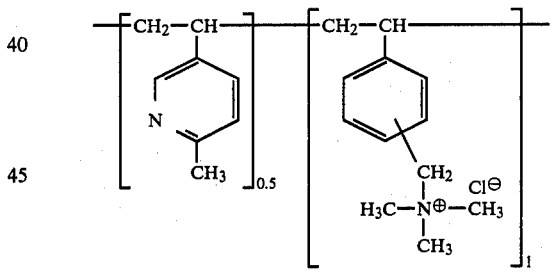

EXAMPLE IV

An image-receiving element comprising the following layers in succession on a white-pigmented polyethylene-coated opaque support was prepared, the layers comprising:

1. a polymeric acid-reacting layer at a coverage of about 1700 mgs./ft.$^2$ (8,299 mgs./m.$^2$) comprising a mixture of about nine parts, by weight, of a partial ester of polyethylene/maleic anhydride, about one part, by weight, of polyvinyl butyral resin (Butvar ®, Shawinigan Products, New York, N.Y.) and a minor amount of titanium dioxide;

2. a timing layer at a coverage of about 760 mgs./ft.$^2$ (8,181 mgs./m.$^2$) comprising 1.7 parts, by weight, of hydroxypropyl cellulose (Klucel 5-79, Hercules, Inc., Wilmington, Delaware) and about one part, by weight, of polyvinyl alcohol; and 3. an image-receiving layer at a coverage of about 655 mgs./ft.$^2$ (7,050 mgs./m.$^2$) prepared by coating and drying a coating composition comprising the following components in approximate weight/weight percent amounts:

| Components | wt./wt. % |
|---|---|
| a 2-methyl-5-vinylpyridine/vinylbenzyl trimethyl ammonium chloride copolymer (2.2/1 mole ratio, prepared as described in Example II) | 1.96 |
| polyvinyl alcohol | 3.96 |
| lactic acid | 0.93 |
| emulsifier | 0.04 |
| acrolein/formaldehyde condensate | 0.44 |
| hexahydro-4,5-trimethylene-pyrimidine-2-thione | 0.07 |
| water | balance to 100 |

The image-receiving element is identified herein as Image-receiving Element A.

EXAMPLE V

An image-receiving element as described in EXAMPLE IV was prepared, except that, in the formation of the image-receiving layer (layer 3), there was utilized in lieu of the 1.96 wt./wt.% copolymer recited in the coating composition of EXAMPLE IV, a 2-methyl-5-vinylpyridine/vinylbenzyl trimethyl ammonium chloride copolymer of 0.5:1 mole ratio, prepared as described in EXAMPLE III. The resulting image-receiving element is identified herein as Image-receiving Element B.

EXAMPLE VI (CONTROL)

As a means of establishing a basis for comparative evaluation of Image-receiving Element A (EXAMPLE IV), a control image-receiving element (identified as Image-receiving Element A-Control) was prepared. Image-receiving Element A-Control was prepared in the same manner as Image-receiving Element A, except that, in lieu of the 1.96 wt./wt.% copolymer recited in the coating composition of EXAMPLE IV, there was utilized 1.96 wt./wt.% of a 2.6:1 mole ratio copolymer of 4-vinylpyridine and vinylbenzyl trimethyl ammonium chloride.

EXAMPLE VII (CONTROL)

As a means of establishing a basis for comparative evaluation of Image-receiving Element B (EXAMPLE V), a control image-receiving element (identified as Image-receiving Element B-Control) was prepared. Image-receiving Element B-Control was prepared in the same manner as Image-receiving Element B, except that, in lieu of the 1.96 wt./wt.% of 0.5:1 mole ratio 2-methyl-5-vinylpyridine/vinylbenzyl trimethyl ammonium chloride copolymer utilized in the coating composition for the preparation of Image-receiving Element B, there was utilized 1.96 wt./wt.% of a 0.5:1 mole ratio copolymer of 4-vinylpyridine and vinylbenzyl trimethyl ammonium chloride.

Image-receiving Elements A, A-Control, B and B-Control were densitometrically evaluated to determine relative differences in yellowing properties. The image-receiving elements (prepared as described herein and not subjected to photographic processing) were impinged with white light from a densitometer directed upon the image-receiving layer of each element. The amount of blue light absorbed by each image-receiving layer was measured by the densitometer. The greater the amount of blue light absorbed, the greater the degree of yellowing. The following blue density results, indicative of the amount of blue light absorbed by each sample and reported in TABLE I, were obtained:

TABLE I

| Image-Receiving Element | Copolymer Mordant | Blue Density (In density units) |
|---|---|---|
| A | 2.2:1 copolymer of 2-methyl-5-vinylpyridine/vinylbenzyl trimethyl ammonium chloride | 0.06 |
| A-Control | 2.6:1 copolymer of 4-vinylpyridine/vinylbenzyl trimethyl ammonium chloride | 0.07 |
| B | 0.5:1 copolymer of 2-methyl-5-vinylpyridine/vinylbenzyl trimethyl ammonium chloride | 0.06 |
| B-Control | 0.5:1 copolymer of 4-vinylpyridine/vinylbenzyl trimethyl ammonium chloride | 0.07 |

It will be seen from inspection of the above results that the respective control image-receiving elements (Image-receiving Elements A-Control and B-Control) exhibited a greater degree of yellowing than the image-receiving elements of the invention (Image-receiving Elements A and B).

EXAMPLE VIII

The image-receiving elements of EXAMPLES IV and V, and the respective controls, were evaluated for maximum and minimum densities and for the tendency for haze formation in the following manner.

A photosensitive element was utilized for the processing and evaluation of each image-receiving element. In the case of Film Units A and A-Control, referred to in Table II hereinafter, the photosensitive element was comprised of an opaque subcoated polyethylene terephthalate film base having the following layers coated thereon in succession:

1. a layer of sodium cellulose sulfate coated at a coverage of about 20 mgs./m.$^2$;

2. a cyan dye developer layer comprising a cyan dye developer represented by the formula

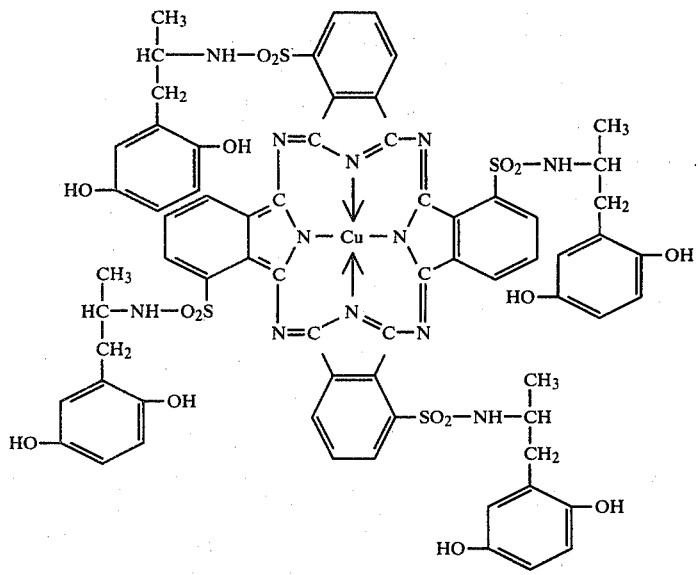

dispersed in a gelatin and coated at a coverage of about 1492 mgs./m.$^2$ of the dye developer and about 748 mgs./m.$^2$ of gelatin;

3. a red-sensitive gelatino silver iodobromide emulsion layer coated at a coverage of about 1665 mgs./m.$^2$ of silver and about 991 mgs./m.$^2$ of gelatin;

4. an interlayer comprising about 1045 mgs./m.$^2$ of a 60.6/29/6.3/3.7/0.4 pentapolymer of butylacrylate, diacetone acrylamide, styrene, methacrylic acid and acrylic acid and about 55 mgs./m.$^2$ of polyacrylamide;

5. a layer comprising the magenta dye developer

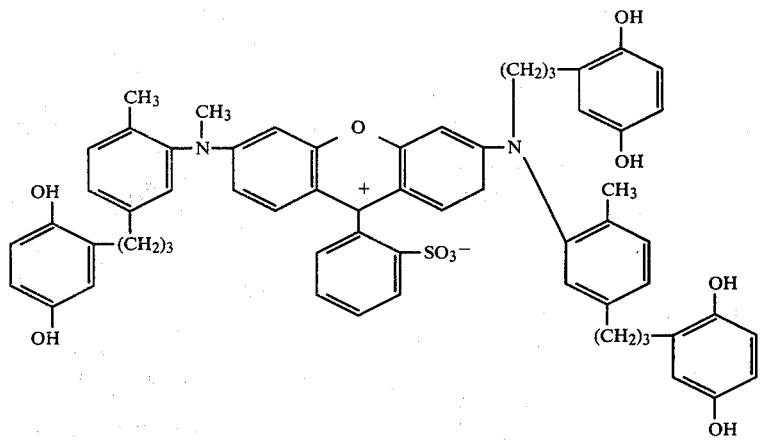

dispersed in gelatin and coated at a coverage of about 1327 mgs./m.$^2$ of dye and about 665 mgs./m.$^2$ of gelatin;

6. a green-sensitive gelatino silver iodobromide emulsion layer coated at a coverage of about 800 mgs./m.$^2$ of silver and about 352 mgs./m.$^2$ of gelatin;

7. an interlayer comprising about 1424 mgs./m.$^2$ of a 60.6/29/6.3/3/7/0.4 pentapolymer of butylacrylate, diacetone acrylamide, styrene, methacrylic acid and acrylic acid and about 176 mgs./m.$^2$ of polyacrylamide;

8. a layer comprising the yellow dye developer

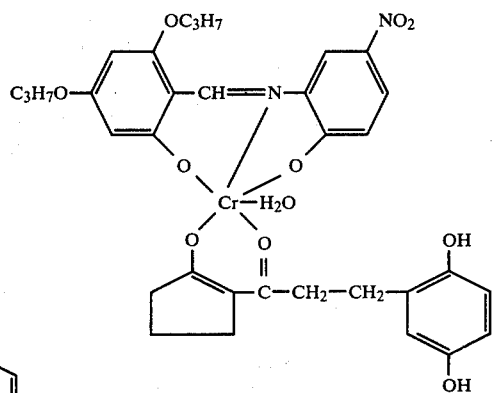

dispersed in gelatin and coated at a coverage of about 690 mgs./m.$^2$ of dye and about 276 mgs./m.$^2$ of gelatin;

9. a blue-sensitive gelatino silver iodobromide emulsion layer coated at a coverage of about 890 mgs./m.$^2$ of silver, about 571 mgs./m.$^2$ of gelatin, and about 284 mgs./m.$^2$ of 4'-methylphenylhydroquinone; and 10. a gelatin overcoat layer coated at a coverage of about 430 mgs./m.$^2$ of gelatin.

In the case of Film Units B and B-Control, referred to in Table II hereinafter, the photosensitive element was comprised of an opaque subcoated polyethylene terephthalate film base having the same composition and structure as the photosensitive element of the immediately preceding description except that: layer #2 comprised the same cyan dye developer dispersed in gelatin at coverages of about 1327 mgs./m.$^2$ of the dye developer and 665 mgs./m.$^2$ of gelatin; and layer #4 comprised an interlayer of the same pentapolymer and polyacrylamide at coverages of about 855 mgs./m.$^2$ of the pentapolymer and 45 mgs./m.$^2$ of polyacrylamide.

Film units were prepared utilizing each of Image-receiving Elements A, A-Control, B and B-Control and a photosensitive element as aforedescribed. In each case, the image-receiving elements and the photosensitive elements were placed in a face-to-face relationship, i.e., with their respective supports outermost, and a rupturable container retaining an aqueous alkaline processing composition was affixed between the image-receiving and photosensitive elements at the leading edge of each film unit (such that the application of compressive pressure to the container would rupture the seal of the container along the marginal edge thereof and distribute the contents thereof uniformly between the photosensitive and image-receiving elements). The composition of the aqueous alkaline processing composition utilized for the processing of each film unit is set forth in the following TABLE II wherein each film unit is identified by reference to the image-receiving element thereof:

TABLE II

| Component | Film Units A & A-Control Amount in Weight Percent | Film Units B & B-Control |
|---|---|---|
| Water | 85.65 | 85.99 |
| Carboxymethyl hydroxyethyl cellulose | 2.60 | 2.60 |
| Potassium hydroxide | 6.93 | 6.95 |
| N—phenethyl-α-picolinium bromide | 1.62 | 1.62 |
| N—benzyl-α-picolinium bromide | 0.43 | 0.43 |
| Benzotriazole | 1.53 | 1.03 |
| 6-methyl uracil | 0.42 | 0.43 |
| 6-bromo-5-methyl-4-azobenzimidazole | 0.13 | 0.13 |
| 4-Aminopyrazolo(3,4d)pyrimidine | 0.08 | 0.08 |
| Zinc nitrate | 0.44 | 0.44 |
| 3,5-dimethyl pyrazole | 0.17 | 0.17 |
| Bis-(β-aminoethyl)-sulfide | — | 0.13 |

Each film unit was subjected to a standard sensitometric exposure and was processed at room temperature (about 75° F.) by spreading the respective processing composition between the elements as they were brought into superposed relationship between a pair of pressure-applying rollers having a gap of about 0.0038. After an imbibition period of about 1 minute, the image-receiving element was in each case separated from the remainder of the film unit to reveal the dye image. About one-half of the picture area of each element was then wiped with mineral oil, and the reflection density to blue light in the maximum density region of the image was measured on each half using a densitometer. In each instance, the density was lower on the unoiled portion due to light diffraction, i.e., haze, and the extent of the difference between the density readings from each half, in density units was taken as a measure of haze for each image-receiving element, i.e., the greater the difference in densities, the greater the haze reading. Maximum red, green and blue reflection densities were measured in each case from the oiled portion of each image. In addition, as a means of evaluating yellowing properties, minimum blue density was measured in each instance. TABLE III summarizes the results obtained from the evaluation of each film unit.

TABLE III

| Film Unit | Haze Reading (Density Units) | Oiled D-Max | | | D-Min |
|---|---|---|---|---|---|
| | | Red | Green | Blue | Blue |
| A | 0.03 | 1.91 | 2.80 | 2.19 | 0.16 |
| A-Control | 0.37 | 1.91 | 2.56 | 2.10 | 0.18 |
| B | 0.52 | 1.98 | 2.62 | 1.91 | 0.16 |
| B-Control | 0.66 | 2.17 | 2.71 | 2.01 | 0.17 |

It can be seen from inspection of the results set forth in TABLE III that each film unit of the invention utilizing an image-receiving element comprising a copolymer of 2-methyl-5-vinylpyridine and vinylbenzyl trimethyl ammonium chloride (Film Units A and B) provided images having a significant reduction in haze relative to a corresponding control film unit utilizing an image-receiving element comprising a copolymer of 4-vinylpyridine and vinylbenzyl trimethyl ammonium chloride (Film Units A-Control and B-Control). It will also be noted from a comparison of blue minimum densities for Film Units A and A-Control (and from a comparison of blue minimum densities for Film Units B and B-Control) that the images obtained from the film units of the invention were less yellow.

What is claimed is:

1. A copolymer containing recurring units according to the formula

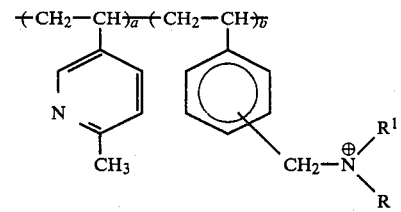

wherein each of $R^1$, $R^2$ and $R^3$ is independently alkyl; substituted-alkyl; cycloalkyl; aryl; aralkyl; alkaryl; or at least two of $R^1$, $R^2$ and $R^3$, together with the quaternary nitrogen atom to which they are bonded complete a saturated or unsaturated, substituted or unsubstituted nitrogen-containing heterocyclic ring; X is an anion; and wherein the molar ratio of the respective recurring units represented by integers a and b is in the range of from about 0.1:1 to about 10:1.

2. The copolymer of claim 1 wherein the molar ratio of a:b is in the range of from about 0.3:1 to about 3:1.

3. The copolymer of claim 1 wherein each of $R^1$, $R^2$ and $R^3$ is alkyl and X is halide.

4. The copolymer of claim 3 wherein each of $R^1$, $R^2$ and $R^3$ is methyl, X is chloride and the molar ratio of a:b is in the range of from about 0.3:1 to about 3:1.

5. The copolymer of claim 1 wherein each of $R^1$ and $R^2$ is alkyl, $R^3$ is cyclohexyl and the molar ratio of a:b is in the range of from about 0.3:1 to about 3:1.

6. The copolymer of claim 2 wherein each of $R^1$, $R^2$ and $R^3$ is alkyl.

7. The copolymer of claim 6 wherein each of $R^1$, $R^2$ and $R^3$ is methyl.

8. The copolymer of claim 7 wherein the molar ratio of a:b is about 2.2 to 1.

9. The copolymer of claim 7 wherein the molar ratio of a:b is about 0.5:1.

* * * * *